United States Patent [19]

Tunmore

[11] Patent Number: 4,741,410

[45] Date of Patent: May 3, 1988

[54] ENERGY STORAGE AUTOMOTIVE DRIVE SYSTEM PARTICULARLY ADAPTABLE FOR RETROFITTING

[75] Inventor: Fred Tunmore, San Mateo, Calif.

[73] Assignee: Advanced Energy Systems Inc., Redwood City, Calif.

[21] Appl. No.: 752,055

[22] Filed: Jul. 5, 1985

[51] Int. Cl.[4] .......... B60K 9/00

[52] U.S. Cl. .......... 180/165; 60/626; 60/629; 60/718; 180/307; 192/0.055; 192/0.094

[58] Field of Search .......... 180/165, 307; 192/0.055, 0.082, 0.094; 60/625, 626, 628, 629, 716, 718

[56] References Cited

U.S. PATENT DOCUMENTS

| | | | |
|---|---|---|---|
| 3,882,950 | 5/1975 | Strohlein | 180/165 |
| 3,903,696 | 9/1975 | Carman | 60/414 |
| 4,098,144 | 7/1978 | Besel et al. | 74/687 |
| 4,132,283 | 1/1979 | McCurry | 180/165 |
| 4,196,587 | 4/1980 | Shiber | 60/414 |
| 4,215,545 | 8/1980 | Morello et al. | 60/413 |
| 4,242,922 | 1/1981 | Baudoin | 180/165 |
| 4,276,951 | 7/1981 | Smitley | 180/165 |
| 4,282,947 | 8/1981 | Kemper | 180/165 |
| 4,350,220 | 9/1982 | Carman | 180/165 |
| 4,382,484 | 5/1983 | Anderson et al. | 180/165 |

FOREIGN PATENT DOCUMENTS

| | | | |
|---|---|---|---|
| 2551580 | 11/1975 | Fed. Rep. of Germany | 180/165 |
| 2462058 | 4/1976 | Fed. Rep. of Germany | 180/165 |

OTHER PUBLICATIONS

Scott, David, Regenerative Braking System Could Cut Fuel Consumption, *Automotive Engineering*, May 1976, pp. 18–19.

Scott, David, Regenerative Braking Cuts Bus Fuel Needs, *Automotive Engineering*, Oct. 1979, pp. 102–107.

Hagin et al. *Drive Systems with Brake Energy Recovery*, Int'l. Auto. Propulsion Sys. Symposium, 4–1980, pp. 592–613.

Black Hawk Resources Co., 8–1980.

Brake-Power Buses, by David Scott, 1–1985.

*Primary Examiner*—John J. Love
*Assistant Examiner*—Eric D. Culbreth
*Attorney, Agent, or Firm*—Chernoff, Vilhauer, McClung & Stenzel

[57] ABSTRACT

An energy storage automotive drive system wherein energy from deceleration of a vehicle is stored, preferably in pressurized fluid form, for use upon acceleration. The drive system is designed primarily for retrofitting of existing vehicles and has control features adapted to facilitate installation, maximize efficiency and protect the system against malfunction, wear and excessive stress.

11 Claims, 3 Drawing Sheets

LP HP TO 56 TO 64 TO 48 TO 90 TO 96
88 CONTROLLER 38
62 68 66 64 32 34 36 70 30 26 52 50 54 58 12 28 60 56 72 76 42 78 48 44 46 18 16 20 24 22
79 ENGINE AUTO TRANS DIFF.
10 14 41 40 74 24

CLUTCH ENGAGEMENT 80
82
LP
HP
84
86
95
94
90
92
93
122
120
114
124
128
130
118
104
100
106
108
116
96
98
102
42
110
112

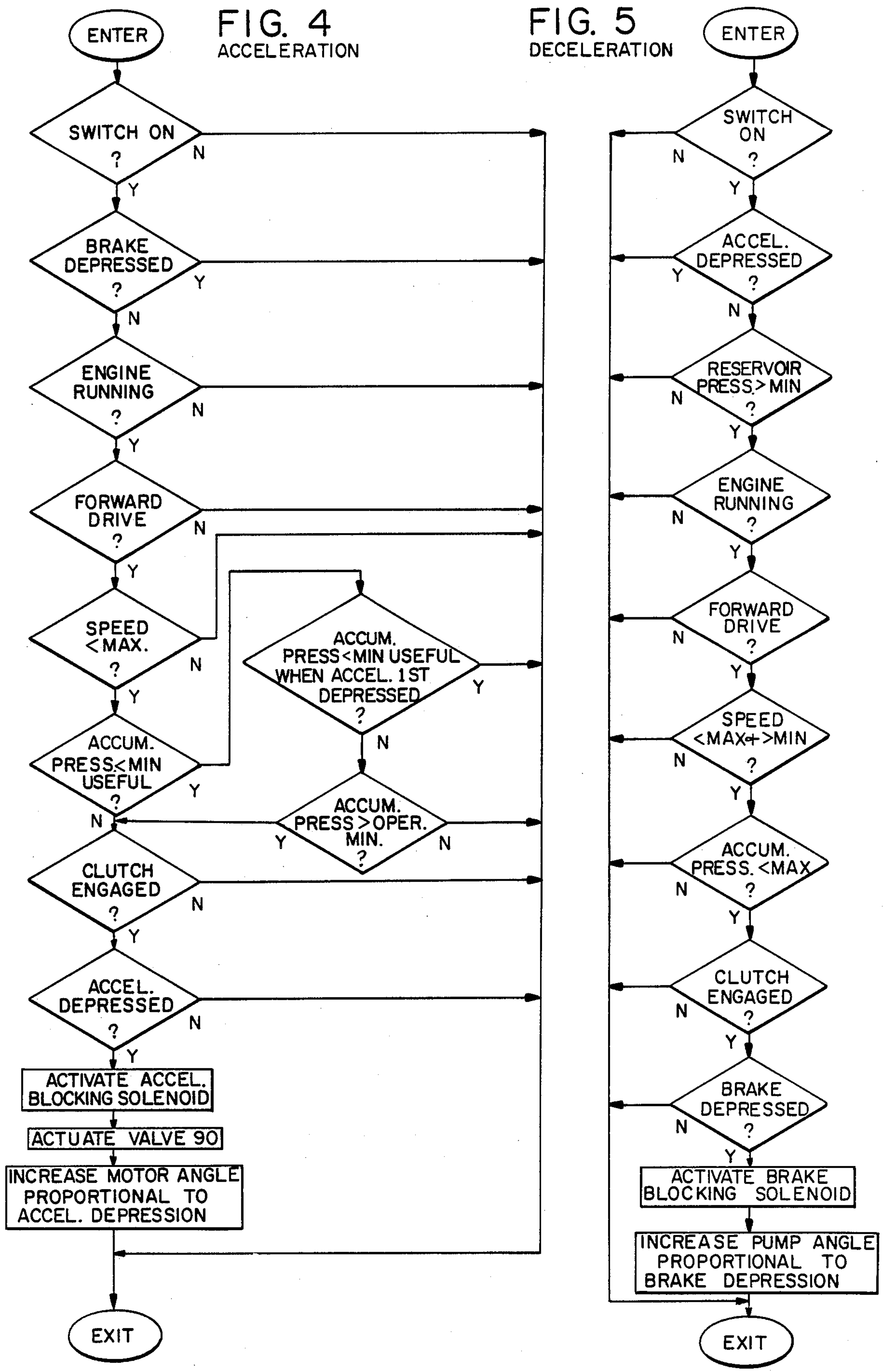
FIG. 4
ACCELERATION
ENTER
SWITCH ON ?
N
Y
BRAKE DEPRESSED ?
Y
N
ENGINE RUNNING ?
N
Y
FORWARD DRIVE ?
N
Y
SPEED <MAX. ?
N
Y
ACCUM. PRESS<MIN USEFUL ?
Y
N
ACCUM. PRESS<MIN USEFUL WHEN ACCEL. 1ST DEPRESSED ?
Y
N
ACCUM. PRESS>OPER. MIN. ?
Y
N
CLUTCH ENGAGED ?
N
Y
ACCEL. DEPRESSED ?
N
Y
ACTIVATE ACCEL. BLOCKING SOLENOID
ACTUATE VALVE 90
INCREASE MOTOR ANGLE PROPORTIONAL TO ACCEL. DEPRESSION
EXIT
FIG. 5
DECELERATION
ENTER
SWITCH ON ?
N
Y
ACCEL. DEPRESSED ?
Y
N
RESERVOIR PRESS.>MIN ?
N
Y
ENGINE RUNNING ?
N
Y
FORWARD DRIVE ?
N
Y
SPEED <MAX+>MIN ?
N
Y
ACCUM. PRESS.<MAX ?
N
Y
CLUTCH ENGAGED ?
N
Y
BRAKE DEPRESSED ?
N
Y
ACTIVATE BRAKE BLOCKING SOLENOID
INCREASE PUMP ANGLE PROPORTIONAL TO BRAKE DEPRESSION
EXIT

ENERGY STORAGE AUTOMOTIVE DRIVE SYSTEM PARTICULARLY ADAPTABLE FOR RETROFITTING

BACKGROUND OF THE INVENTION

The present invention relates to an energy storage automotive drive system primarily adapted for inexpensive retrofitting of existing vehicles such as vans and buses which typically consume fuel at a high rate. Although the preferred embodiment of the invention is hydraulic, alternative modes of energy storage are also within the scope of the invention, such as flywheel or torsional systems. Also, use of the invention as original equipment, rather than as a retrofit unit, is contemplated. Although the energy storage accumulator of the invention is shown as being charged exclusively by deceleration of the vehicle, engine charging of the accumulator could optionally be included, as could an engine stop-start function.

A large number of energy storage automotive drive systems have been developed in the past, or are currently under development. Exemplary of the simpler types of units which do not feature engine charging of the energy storage accumulator are the following: Published German patent applications Nos. 24 62 058 (FIG. 1) and 25 51 580; the M.A.N. Hydrobus discussed in Hagin, *Drive Systems With Brake Energy Recovery,* Apr. 14–18, 1980; Scott, *International Viewpoints,* Automotive Engineering, October 1979; unit developed by Blackhawk Resources Company discussed in excerpts from National Aeronautics and Space Administration report No. NASAPM-73-765; a Leyland unit discussed in Scott, *International Viewpoints,* Automotive Engineering, May 1976; and a Volvo hydraulic unit discussed in Scott, *Brake-Power Buses,* January 1985.

More complicated systems, featuring engine charging of the accumulator and, in some cases, engine stop-start, are exemplified by: Carman, U.S. Pat. No. 3,903,696; Besel et al., U.S. Pat. No. 4,098,144; McCurry, U.S. Pat. No. 4,132,283; Shiber, U.S. Pat. No. 4,196,587; Morello et al., U.S. Pat. No. 4,215,545; Smitley, U.S. Pat. No. 4,276,951; Kemper, U.S. Pat. No. 4,282,947; Baudoin, U.S. Pat. No. 4,242,922; Carman, U.S. Pat. No. 4,350,220; Anderson et al., U.S. Pat. No. 4,382,484 and references cited therein.

The aforementioned October 1979 and January 1985 Scott articles, Besel et al., U.S. Pat. No. 4,098,144 and Morello et al., U.S. Pat. No. 4,215,545, mention a maximum vehicle speed limit for operation of the energy storage system. McCurry, U.S. Pat. No. 4,132,283 mentions control of a fixed displacement hydraulic motor and clutch in response to hydraulic accumulator pressure. The January 1985 Scott article mentions idling of the engine during hydraulic system operation in an accelerating mode. Baudoin, U.S. Pat. No. 4,242,922 describes a braking system in which total braking is the sum of regenerative and friction braking, with friction braking apparently being controlled by the operator in response to the perceived vehicle deceleration rate. Anderson et al., U.S. Pat. No. 4,382,484, describes hydraulic system operation in an accelerating mode in response to a comparison of predicted energy usage to accumulator pressure.

However, none of the foregoing systems has addressed the combined problems of how to provide controls which facilitate inexpensive installation while ensuring high efficiency, minimized wear and prevention of undue stress and malfunction in energy storage drive systems.

SUMMARY OF THE PRESENT INVENTION

It is a principal object of the present invention to provide an energy storage automotive drive system having controls and components which are relatively uncomplicated and inexpensive to manufacture and install, thereby rendering the unit particularly adaptable for retrofitting of existing vehicles which suffer from high fuel consumption such as vans and buses.

It is a further objective of the present invention to make such controls, although uncomplicated and inexpensive, highly effective to ensure efficient operation and prevention of malfunction, wear and undue stress.

The foregoing and other objectives, features and advantages of the present invention will be more readily understood upon consideration of the following detailed description of the invention, taken in conjunction with the accompanying drawings.

BRIEF DESCRIPTION OF THE DRAWINGS

FIGS. 3, 4 and 5 are logic flow diagrams of the control functions of an exemplary microprocessor controller for the invention.

DETAILED DESCRIPTION OF THE INVENTION

Figure 1:
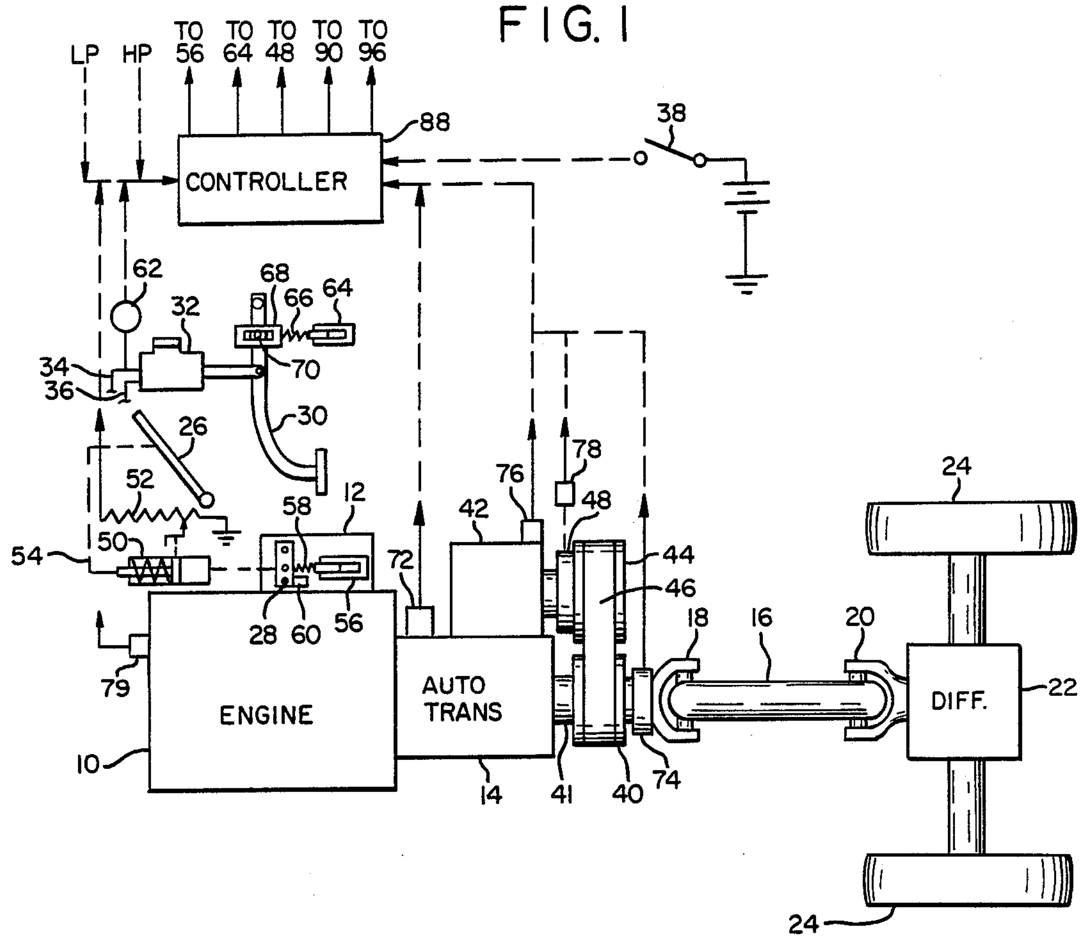
FIG. 1 is a schematic diagram of the mechanical components of an exemplary embodiment of the invention.

FIG. 1 depicts an exemplary vehicle drive system which has been modified by retrofitting in accordance with the present invention. The conventional vehicle elements are an internal combustion engine 10 having a fuel supply controller 12 such as a carburetor or fuel injection system, a transmission 14 preferably of the automatic type, a drive shaft 16 interconnected by a pair of universal joints 18 and 20 between the transmission 14 and a differential 22, and a pair of drive wheels 24. The standard vehicle is also provided with an accelerator 26 for regulating a control arm 28 on the fuel supply controller 12, and a brake 30 connected to a hydraulic brake system master cylinder 32 which distributes pressurized brake fluid through a conduit 34 to friction brakes at the front wheels (not shown) of the vehicle and through another conduit 36 to friction brakes at the rear wheels 24. An operator-actuated switch 38 selectively enables or disables the drive system.

Modification of the conventional elements of the drive system to enable it to collect and store energy from the deceleration of the vehicle, and use it to accelerate the vehicle, involves affixing a sprocket 40 to the output shaft 41 of the transmission 14 (making whatever other changes to the drive shaft and universal joints are necessary to accommodate the insertion of the sprocket 40). A hydraulic pump-motor 42 (or, alternatively, a separate pump and motor) having its own corresponding sprocket 44 is mounted in selective driving/driven relationship with the sprocket 40, the drive connection being by means of a cogged belt 46 or comparable torque transmitting member. A selectively engageable clutch 48, which may be of the hydraulic or electric type as desired, is interposed between the pump-motor 42 and the sprocket 44. Alternatively, the clutch 48 could be interposed between the sprocket 40 and the transmission output shaft 41.

Modification of the vehicle further includes modification of both the accelerator and brake systems. A spring link 50 having a variable potentiometer 52 is inserted in the standard mechanical linkage 54 between the accelerator 26 and control arm 28 of the fuel supply controller 12. Also, a blocking solenoid 56 is attached by a tension spring 58 to the control arm 28 to pull it against the idle stop 60 when retracted, for purposes to be described hereafter.

With respect to the brake system, a pressure transducer 62 is tapped preferably into th front brake fluid line 34, and a second blocking solenoid 64 is attached by a tension spring 66 and slotted link 68 to the brake pedal arm by slidable engagement of the link 68 with a pin 70 inserted through the brake pedal arm. As an alternative to the liquid brake system shown, the transducer 62 could be tapped into a pressurized air brake system.

Other transducers added to the vehicle are a transmission forward drive sensor 72, a vehicle speed sensor 74, a sensor 76 to indicate whether the pump-motor 42, which is preferably of the variable displacement type, is at zero displacement, a sensor 78 to indicate whether or not the c]utch 48 is engaged, and an engine rpm or intake vacuum sensor 79 to indicate whether the engine is running.

Figure 3:
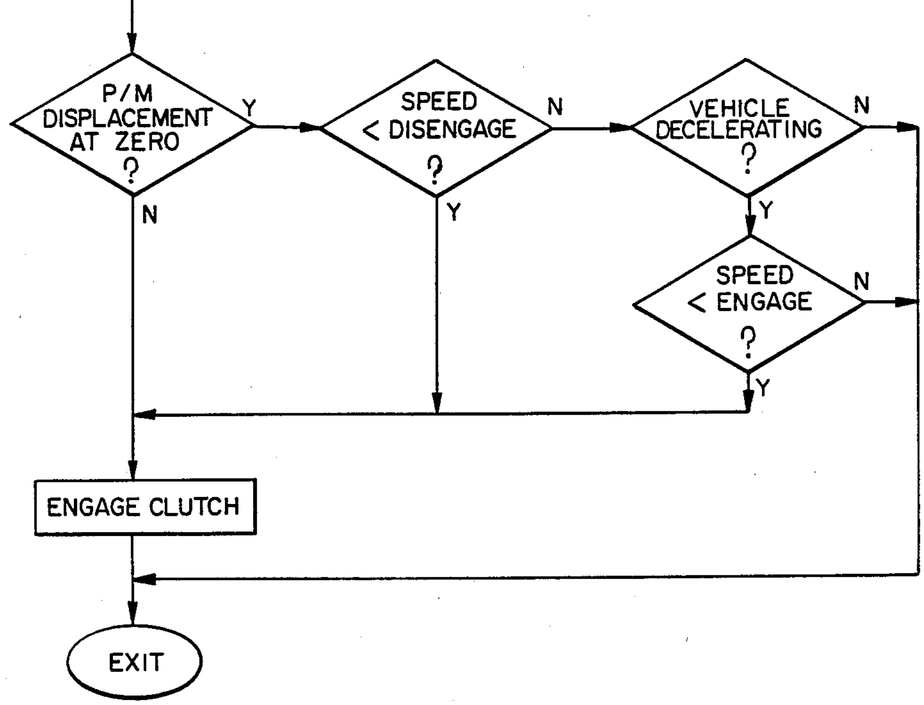

A low-pressure hydraulic reservoir 80 and high-pressure hydraulic accumulator 82, together with their respective fluid pressure sensors 84 and 86, are also added to the vehicle, together with the associated hydraulic circuit of the pump-motor 42 (FIG., 2). Finally, a suitable mircroprocessor controller 88, such as a model COPS 420 manufactured by National Semiconductor of Dayton, Ohio, programmed in accordance with the logic flow diagrams of FIGS. 3, 4 and 5, is provided for receiving signals from the various sensors, potentiometers and other transducers described above, and delivering control signals to the valves of the hydraulic circuit of FIG. 2, the clutch 48 and the blocking solenoids 56 and 64 in the manner to be described hereafter.

HYDRAULIC SYSTEM

Preliminary to an explanation of the operation of the entire system, the elements of the hydraulic circuit of FIG. 2 and their functions will be explained. Valve 96 controls the displacement of variable displacement pump-motor 42 under normal operating conditions when the high-pressure accumulator 82 contains at least a minimum control pressure. Under such conditions, the valve 96 in the position shown in FIG. 2 causes the pump motor 42 to be at zero displacement by blocking its stroke controller 98 from exposure to the high pressure in pilot line 100. Conversely, movement of the valve 96 toward the left in FIG. 2 variably exposes the stroke controller 98 to high pressure from line 100 through pilot line 102 to increase the displacement. The degree of displacement depends upon the pressure in line 102, which is modulated by valve 96 by its variable splitting of the pressurized fluid in line 100 between line 102 and low-pressure exhaust line 104, depending upon the position of the valve 96. By regulating the displacement of pump-motor 42, the ultimate purpose of valve 96 is to regulate the accelerating or decelerating torque imposed by the pump-motor 42 on the wheels 24. Accordingly, valve 96 operates in a servo-controlled manner receiving a torque feedback signal from the pump-motor 42 through line 106, which is balanced against variable operator torque demand transmitted through the valve's variable-force electromagnetic linear actuator 108 which imposes a force proportional to operator foot pressure on the accelerator or brake pedal, as the case may be.

If, for any reason such as leakage or a long period of nonuse, the pressure of the fluid in accumulator 82 should drop below the minimum control pressure necessary for operating the stroke controller 98, a spring-loaded mechanical stroke controller 110, which is usually deactivated in response to an accumulator pressure at or above the minimum control pressure sensed through line 112, becomes actuated in response to the lower pressure of the exhausted accumulator 82 so as to partially increase the displacement of the pump above zero until such time as enough energy can be generated from the deceleration of the vehicle for the pump-motor 42 to charge the accumulator above its minimum control pressure. At that time the higher pressure in line 112 deactivates the mechanical stroke controller 110 and returns the displacement control of the pump-motor 42 to the stroke controller 98 in response to valve 96.

In response to certain conditions to be described hereafter, pump-motor 42 is able to receive pressurized fluid from accumulator 82 and, acting as a motor, drive the wheels 24 to accelerate the vehicle. Under such conditions, the initial movement of the accelerator shifts solenoid valve 90 downward from the position shown in FIG. 2 eliminating high pressure in pilot lines 92 and 93 which normally holds valves 94 and 95 closed, thereby causing valves 94 and 95 to open. The opening of valve 94 permits the delivery of pressurized fluid from accumulator 82 through lines 114 and 116 to the intake of pump-motor 42, from which the fluid is exhausted through lines 118 and 120 and valve 95 to the low-pressure reservoir 80. Meanwhile the displacement of pump-motor 42, and thus its torque output and the speed of the vehicle, are regulated by the operator's depression of the accelerator pedal which determines the position of modulating valve 96 as previously explained.

Alternatively, under other conditions to be described hereafter, pump-motor 42, acting as a pump and being driven by the wheels 24, may be used to decelerate the vehicle while simultaneously charging the high-pressure accumulator 82 with pressurized fluid for future use in accelerating the vehicle. In the decelerating mode, valve 90 is in its normal position shown in FIG. 2 so that valves 94 and 95 are therefore closed. The pump-motor 42, acting as a pump, receives fluid at its input from low-pressure reservoir 80 through lines 122 and 116, and discharges fluid under high pressure through lines 118 and 124 into accumulator 82. The displacement of pump-motor 42, and thus the decelerating torque and rate of deceleration of the vehicle, are controlled by the position of valve 96 in response to brake pedal pressure.

Figure 2:
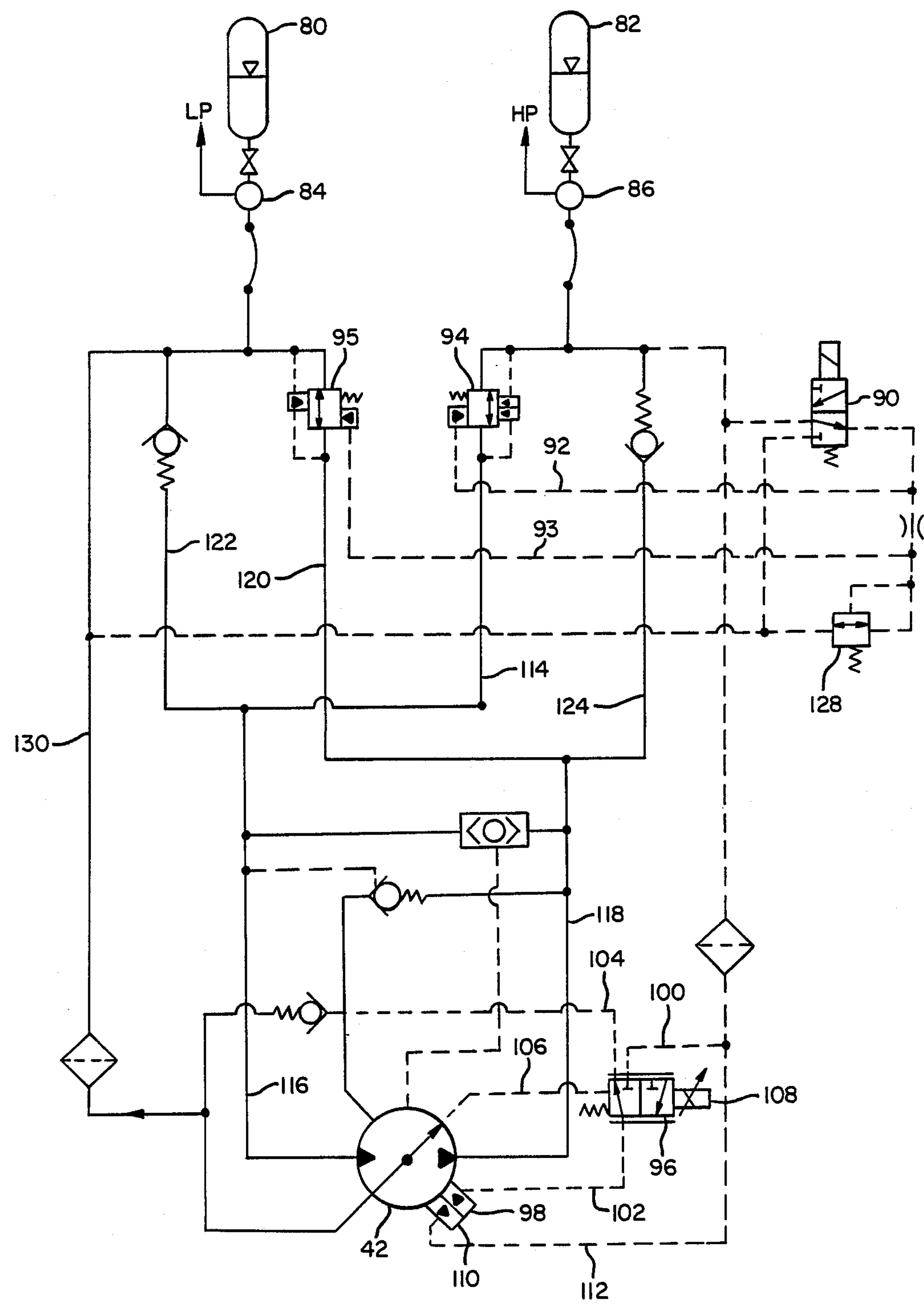
FIG. 2 is an exemplary hydraulic circuit diagram of the invention.

If neither the conditions for the accelerating mode nor the conditions for the decelerating mode of operation are satisfied, the valves 90 and 96 remain in their normal unactuated positions as shown in FIG. 2, resulting in closure of valves 94 and 95 and zero displacement of pump-motor 42.

Although over-pressure of accumulator 82 is limited, in a manner to be described hereafter, by preventing charging of the accumulator above a predetermined pressure, excessive pressure is also limited by valve 128 which, in response to excessive accumulator pressure sensed in line 92, opens to exhaust some of the fluid from the accumulator into drain line 130.

A preferable variable displacement type of pump-motor 42 for use in the present invention is shown in Ifield, U.S. Pat. No. 4,129,063, which is incorporated herein by reference.

OPERATION

A. Conventional Mode

Except when certain prerequisites for operation of the pump-motor 42 in either an accelerating or decelerating mode are met, the vehicle is driven by its engine 10 through its transmission 14, in the conventional manner with the accelerator 26 controlling the fuel supply controller 12 through mechanical linkage 54. Brake 30, acting through the master cylinder 32, hydraulically controls the vehicle's friction brakes in the conventional manner.

During operation of the vehicle in the conventional manner, clutch 48, whose engagement is under the control of the controller 88, may or may not be engaged, depending primarily on the speed of the vehicle. The clutch 48 is normally disengaged unless the prerequisites for engagement as shown in the logic flow diagram of FIG. 3 are satisfied. The objective of the clutch control system is to disengage the clutch 48 at high vehicle speeds to prevent overspeeding of the pump-motor 42 and avoid parasitic losses, but ensure that the clutch is always engaged at a speed which is somewhat higher than that at which the pump-motor 42, pursuant to its own control criteria, will be permitted to have a displacement greater than zero. The clutch control system thus attempts to ensure that the clutch 48 will always be engaged prior to any actuation of the hydraulic system of FIG. 2, which is particularly important to prevent inadvertent overspeeding of the pump-motor in the hydraulic accelerating mode which could occur if its displacement were increased above zero without any torque load being imposed by the clutch 48. In fact, as seen in FIG. 3, a precautionary element in the logic flow diagram is that the clutch 48 automatically engages, regardless of vehicle speed, if the controller 88 senses, through sensor 76, that the displacement of the pump-motor is greater than zero. However, assuming that the prerequisites for operation of the hydraulic system in either the accelerating or decelerating mode are not satisfied, the displacement of pump-motor 42 should be at zero. Accordingly, for clutch 48 to be engaged, the speed of the vehicle as sensed by speed sensor 74 must be less than a predetermined disengagement speed (for example 35 miles per hour). Thus, if the vehicle is accelerating, the clutch will disengage at such speed. However, if the vehicle is in the act of decelerating, as indicated by the direction of change of the signal from speed sensor 74, the maximum clutch engagement speed could optionally be somewhat higher (for example 40 miles per hour). This difference between clutch disengagement and clutch engagement speeds anticipates that the deceleration rate of the vehicle might often be greater than its acceleration rate, requiring some extra time to engage the clutch before the expected actuation of the hydraulic system.

B. Hydraulic Accelerating Mode

The operation of the hydraulic circuit of FIG. 2 in the accelerating mode, whereby the pump-motor 42 acts as a motor receiving pressurized fluid from the accumulator 82 to accelerate the vehicle, requires that the controller 88 sense that all of the following conditions are met, as further shown in the logic flow diagram of FIG. 4:

1. The switch 38 must be on;
2. The brake 30 must not be depressed, as determined by the lack of a pressure signal from pressure transducer 62;
3. The engine must be running, as sensed by sensor 79;
4. The transmission 14 must be in forward drive, as indicated by sensor 72;
5. The speed of the vehicle, sensed by speed sensor 74, must be less than a predetermined maximum speed (for example 30 miles per hour) which is less than the speed at which the clutch 48 must be engaged, as discussed earlier;
6. The pressure of the fluid in accumulator 82, as sensed by pressure transducer 86, must not be below a predetermined minimum useful pressure for acceleration purposes (for example 3000 psi);
7. The clutch 48 must be engaged, as sensed by sensor 78; and
8. The accelerator pedal 26 must be depressed, as sensed by the variable potentiometer 52.

When the controller 88 senses that all of the foregoing conditions are met, the controller sends a signal to the accelerator blocking solenoid 56 to retract it, to pull the fuel supply control arm 28 against the idle stop 60. This inhibits the mechanical accelerator link 54 from controlling the fuel supply to the engine 10. However, during accelerating conditions requiring engine assist, substantially full depression of the accelerator pedal 26 will cause the force transmitted by the spring link 50 on the control arm 28 to overcome the opposing tension force exerted by the solenoid spring 58, and thereby permit the control arm 28 to be moved from its idle position. The primary objective of the foregoing system for overriding accelerator control of engine fuel supply, during operation of the hydraulic circuit in its accelerating mode, is to prevent excessive buildup of engine rpm during such hydraulic circuit operation which would otherwise occur, if the fuel supply were not limited, due to the hydraulic circuit's shouldering of the accelerating torque load.

When the foregoing eight conditions are met, the controller 88 actuates solenoid valve 90 (FIG. 2) to relieve the pressure in pilot lines 92 and 93 and thereby open valves 94 and 95 to allow pressurized fluid to flow from the accumulator 82 to drive the pump-motor 42. Valve 96 is then caused by the controller to increase the displacement of pump-motor 42 above zero in proportion to the degree of accelerator depression as sensed by potentiometer 52.

Pressurized fluid from the accumulator 82 drives the pump-molor 42 as a motor to accelerate the vehicle until any of the above conditions 1 through 5, 7 and 8, which are repeatedly monitored, are not met, or until the pressure in the accumulator 82 decreases to a predetermined minimum operating pressure which is lower than the aforementioned minimum useful pressure necessary to commence operation of the hydraulic system in the acceleration mode. The minimum operating pressure is set at a value somewhat greater than the minimum control pressure needed to control the displacement of pump-motor 42 through stroke controller 98, as previously discusssed, to preserve enough pressure in the accumulator to operate the stroke controller 98. Thereafter the controller 88 prevents the valve 96 from maintaining the displacement of the pump-motor 42 above zero, deactivates solenoid valve 90 and deactivates the acoelerator blocking solenoid 56 to return the vehicle to its conventional drive condition wherein the engine 10, rather than the pump-motor 42, drives the vehicle.

Although the engine remains connected through the transmission 14 to the drive system during operation of the hydraulic system in the accelerating mode, the standard torque converter coupling of the automatic transmission 14 acts similar to a one-way clutch causing only sufficient buildup of engine rpm to insure a smooth, shock-free conversion to the conventional drive condition when the hydraulic system is deactivated, without thereby permitting any significant parasitic energy loss. Prevention of significant energy loss by the delivery of retarding torque to the engine in the hydraulic decelerating mode, to be discussed hereafter, is likewise prevented by the torque converter coupling. The absence of such coupling, for example in a nonautomatic transmission, can be compensated for by the addition of an equivalent clutch interposed between the transmission output shaft 41 and the sprocket 40.

C. Hydraulic Decelerating Mode

The operation of the hydraulic circuit of FIG. 2 in the decelerating mode, whereby the pump-motor 42 acts as a pump driven by the wheels 24 during deceleration to deliver pressurized fluid to the accumulator 82, requires that the controller 88 sense that all of the following corditions are met, as further shown in the logic flow diagram of FIG. 5:

1. The switch 38 must be on;

2. The accelerator 26 must not be depressed, as sensed by the variable potentiometer 52;

3. The pressure of fluid in low-pressure reservoir 80 must be greater than a predetermined minimum (for example 40 psi) as sensed by pressure transducer 84;

4. The engine must be running, as sensed by sensor 79;

5. The transmission 14 must be in forward drive, as indicated by sensor 72;

6. The speed of the vehicle, sensed by speed sensor 74, must be less than a predetermined maximum speed (for example 30 miles per hour) which is less than the speed at which the clutch 48 must be engaged, as discussed earlier, and the speed of the vehicle must also be greater than a predetermined minimum speed (such as 5 miles per hour) for reasons to be discussed hereafter;

7. The pressure of the fluid in accumulator 82, as sensed by pressure transducer 86, must be less than a predetermined maximum pressure (for example 5300 psi);

8. The clutch 48 must be engaged, as sensed by sensor 78; and

9. The brake pedal 30 must be depressed as sensed by the pressure transducer 62.

When the controller 88 senses that all of the foregoing conditions are met, the depression of the brake 30, as sensed through pressure transducer 62 which is sensitive even to slight brake pedal depression due to its connection to the front wheel brake line 34, causes the controller 88 to send a signal to the brake-blocking solenoid 64 to retract it. Retraction of the brake-blocking solenoid 64 retracts the slotted link 68 sufficiently that relatively slight depression of the brake pedal 30 causes the pin 70 in the brake pedal arm to engage the end of the slot in the link 68 such that the brake pedal encounters a resistance imposed by the spring 66 interconnecting the slotted link 68 with the solenoid 64. When this resistance is encountered, there is insufficient pressure in brake lines 34 and 36 to apply the friction brakes of the vehicle, and therefore all retarding force will be applied by the hydraulic system to maximize the amount of deceleration energy stored. However, if additional braking is needed, the operator's further pressure on the brake pedal 30 overcomes spring 66 and enables the application of the friction brakes.

When the foregoing nine conditions ar met, the depression of the brake 30 also causes the controller 88 to actuate valve 96 to increase the displacement of pump-motor 42 above zero in proportion to the degree of brake depression as sensed by pressure transducer 62. Pressurized fluid is then generated by the pump-motor 42, acting as a pump, and delivered to accumulator 82 while the vehicle decelerates in response to the retarding torque applied by the pump-motor 42. Such deceleration continues until any of the above nine conditions are not met. Thereafter the controller 88 prevents the valve 96 from maintaining the displacement of the pump-motor 42 above zero, and deactivates the brake-blocking solenoid 64 to return the vehicle to its conventional operating condition wherein the friction brakes, rather than the pump-motor 42, retard the vehicle.

The primary purpose of the minimum speed limitation on the operation of the hydraulic system in the decelerating mode is to prevent the hydraulic system from remaining in the decelerating mode when the vehicle is stopped while the operator depresses the brake pedal. Under such conditions, the pump-motor 42 would otherwise be at a large displacement without any useful rotation, and energy would be uselessly expended in maintaining the pump-motor at a displacement above zero.

The deactivation of the hydraulic system from its decelerating mode, in response to the fluid in the hydraulic accumulator exceeding a predetermined maximum pressure, avoids the necessity of exhausting excess output of the pump-motor 42 through a relief valve, which creates needless heat as well as stress and wear on the pump-motor 42.

The terms and expressions which have been employed in the foregoing specification are used therein as terms of description and not of limitation, and there is no intention, in the use of such terms and expressions, of excluding equivalents of the features shown and described or portijns thereof, it being recognized that the scope of the invention is defined and limited only by the claims which follow.

What is claimed is:

1. In a wheeled vehicle having an engine, a vehicle drive system comprising:

(a) energy storage means for collecting and storing energy;

(b) torque transmitting means mechanically coupled to at least one wheel of said vehicle for driving said wheel;

(c) mode selection means for selectively operating said torque transmitting means alternatively either in a first mode, wherein said torque transmitting means receives more energy to drive said wheel from said energy storage means than from said engine, or in a second mode wherein said torque transmitting means receives more energy to drive said wheel from said engine than from said energy storage means;

(d) energy sensor means connected to said energy storage means for sensing the amount of energy stored therein;

(e) said mode selection means including means automatically responsive to said energy sensor means for preventing the commencement of operation of said torque transmitting means in said first mode in response to the amount of energy in said energy storage means being less than a predetermined minimum useful amount; and (f) said mode selection means further including means automatically responsive to said energy sensor means for permitting the delivery of energy from said energy storage means to said torque transmitting means, after the commencement of operation of said torque transmitting means in said first mode, despite the amount of energy in said energy storage means decreasing below said predetermined minimum useful amount, and for subsequently interrupting said delivery of energy in response to the amount of energy in said energy storage means decreasing to a predetermined amount which is less than said predetermined minimum useful amount.

2. In a wheeled vehicle having an engine, a vehicle drive system comprising:

(a) hydraulic accumulator means for storing pressurized fluid;

(b) torque transmitting means having a hydraulic motor mechanically coupled to at least one wheel of said vehicle for driving said wheel;

(c) mode selection means for selectively operating said torque transmitting means alternatively either in a first mode wherein said torque transmitting means receives more energy to drive said wheel from said hydraulic accumulator means through said hydraulic motor then from said engine, or in a second mode wherein said torque transmitting means receives more energy to drive said wheel from said engine than from said hydraulic accumulator means;

(d) a selectively engageable clutch drivingly interposed between said hydraulic motor and said wheel;

(e) speed sensor means for sensing the speed of said vehicle; and (f) control means automatically responsive to said speed sensor means and to the deceleration of said vehicle for causing said clutch to disengage automatically in response to a first predetermined vehicle speed, and for causing first clutch to engage automatically in response to a second predetermined vehicle speed greater than said first predetermined vehicle speed if said second predetermined vehicle speed occurs during deceleration of said vehicle.

3. In a wheeled vehicle having an engine, a vehicle drive system comprising:

(a) hydraulic accumulator means for storing pressurized fluid; p1 (b) torque transmitting means having a variable displacement hydraulic motor capable of zero displacement mechanically coupled to at least one wheel of said vehicle for driving said wheel, said motor having displacement control means for increasing the displacement of said motor above zero in response to the pressure of said fluid in said hydraulic accumulator means being at least as great as a first predetermined minimum pressure;

(c) mode selection means for selectively operating said torque transmitting means alternatively either in a first mode wherein said torque transmitting means receives more energy to drive said wheel from said hydraulic accumulator means through said hydraulic motor than from said engine, or in a second mode wherein said torque transmitting means receives more energy to drive said wheel from said engine than from said hydraulic accumulator means;

(d) pressure sensor means for sensing the pressure of said pressurized fluid in said hydraulic accumulator means; and (e) said mode selection means including displacement control means responsive to said pressure sensor means for substantially preventing the displacement of said hydraulic motor from exceeding zero in response to the pressure of said fluid in said hydraulic accumulator means decreasing to a second predetermined minimum pressure greater than said first predetermined minimum pressure.

4. In a wheeled vehicle having an engine, a vehicle drive system comprising:

(a) energy storage means for collecting and storing energy;

(b) torque transmitting means mechanically coupled to at least one wheel of said vehicle for driving said wheel;

(c) mode selection means for automatically selecting the operation of said torque transmitting means alternatively either in a first mode, wherein said torque transmitting means receives more energy to drive said wheel from said energy storage means than from said engine, or in a second mode wherein said torque transmitting means receives more energy to drive said wheel from said engine than from said energy storage means;

(d) selectively actuated accelerator means for controlling the driving torque to said wheel in both said first mode and said second mode of said torque transmitting means;

(e) movable mechanical linkage means interconnecting said accelerator means with said engine for controlling the flow of fuel to said engine; and (f) means automatically responsive to said mode selection means for inhibiting the movement of said mechanical linkage means in response to the selection of said first mode of operation of said torque transmitting means, and for fully enabling the movement of said mechanical linkage means in response to the selection of said second mode of operation of said torque transmitting means.

5. The apparatus of claim 4, further including means responsive to said accelerator means for enabling said mechanical linkage means to move despite said selection of said first mode of operation.

6. In a wheeled vehicle having an engine, a vehicle drive system comprising:

(a) energy storage means for collecting and storing energy;

(b) torque transmitting means mechanically coupled to at least one wheel of said vehicle for being driven by said wheel during deceleration of said vehicle;

(c) mode selection means for selectively operating said torque transmitting means either in a first mode wherein said torque transmitting means delivers energy from said wheel to said energy storage means, or in a second mode wherein said torque transmitting means does not deliver energy from said wheel to said energy storage means;

(d) selectively actuated accelerator means on said vehicle for accelerating said vehicle;

(e) selectively actuated brake means on said vehicle for decelerating said vehicle by the actuation of friction brakes located at the wheels of said vehicle; and (f) said mode selection means including means automatically responsive to actuation of both said accelerator means and said brake means enabling operation of said torque transmitting means in said first mode in response to actuation of said brake means without simultaneous actuation of said accelerator means, and for preventing operation of said torque transmitting means in said first mode in response to simultaneous actuation of said accelerator means and said brake means.

7. In a wheeled vehicle having an engine, a vehicle drive system comprising:

(a) energy storage means for collecting and storing energy;

(b) torque transmitting means mechanically coupled to at least one wheel of said vehicle for being driven by said wheel during deceleration of said vehicle;

(c) mode selection means for selectively operating said torque transmitting means alternatively either in a first mode wherein said torque transmitting means delivers energy from said wheel to said energy storage means, or in a second mode wherein said torque transmitting means does not deliver energy from said wheel to said energy storage means;

(d) said torque transmitting means including selectively engageable clutch means for delivering energy from said driving wheel to said energy storage means;

(e) speed sensor means for sensing the speed of said vehicle;

(f) said mode selection means including means automatically responsive to said speed sensor means for substantially preventing operation of said torque transmitting means in said first mode unless said speed of said vehicle is less than a first predetermined speed; and (g) clutch engagement control means automatically responsive to said speed sensor means for preventing said clutch means from engaging unless said speed of said vehicle is less than a second predetermined speed greater than said first predetermined speed, and for causing said clutch means to engage automatically in response to a vehicle speed greater than said first predetermined speed.

8. In a wheeled vehicle having an engine, a vehicle drive system comprising:

(a) hydraulic accumulator means for storing pressurized fluid;

(b) torque transmitting means having a variable displacement hydraulic pump capable of zero displacement mechanically coupled to at least one wheel of said vehicle for being driven by said wheel during deceleration of said vehicle;

(c) said variable displacement hydraulic pump being connected to said hydraulic accumulator means for selectively transmitting hydraulic fluid under pressure to said hydraulic accumulator means for storage therein when driven by said wheel;

(d) first pump displacement control means for increasing the displacement of said hydraulic pump above zero in response to pressurized fluid in said hydraulic accumulator at a pressure above a predetermined pressure; and (e) second pump displacement control means for increasing the displacement of said hydraulic pump above zero in response to pressurized fluid in said hydraulic accumulator at a pressure below said predetermined pressure and too low to cause said first pump displacement control means to increase said displacement above zero, said second pump displacement control means including means for automatically deactivating itself in response to pressurized fluid in said hydraulic accumulator at a pressure sufficient to cause said first pump displacement control means to increase said displacement above zero.

9. In a wheeled vehicle having an engine, a vehicle drive system comprising:

(a) energy storage means for collecting and storing energy;

(b) torque transmitting means mechanically coupled to at least one wheel of said vehicle for being driven by said wheel during deceleration of said vehicle;

(c) mode selection means for selectively operating said torque transmitting means alternatively either in a first mode wherein said torque transmitting means delivers energy from said wheel to said energy storage means, or in a second mode wherein said torque transmitting means does not deliver energy from said wheel to said energy storage means;

(d) selectively actuated brake means for controlling the rate of deceleration of said vehicle in both said first mode and said second mode of said torque transmitting means; and (e) mechanical linkage means interconnecting said brake means with said wheels for frictionally retarding said wheels, and means automatically responsive to said mode selection means and connected to said mechanical linkage means for inhibiting said mechanical linkage means from frictionally retarding said wheels in response to the selection of said first mode of operation of said torque transmitting means, and for fully enabling said mechanical linkage means to frictionally retard said wheels in response to the selection of said second mode of operation of said torque transmitting means.

10. The apparatus of claim 9, further including means responsive to said brake means for enabling said mechanical linkage means to frictionally retard said wheels despite said selection of said first mode of operation.

11. The apparatus of any one of claims 1, 4, 5, 6, 7, 9 or 10 wherein said energy storage means comprises hydraulic accumulator means for storing pressurized fluid, and said power transmission means includes hydraulic pump and motor means mechanically coupled to at least one wheel of said vehicle for selectively driving or being driven by said wheel, further including means for transmitting pressurized fluid between said hydraulic accumulator means and said pump and motor means.

* * * * *

UNITED STATES PATENT AND TRADEMARK OFFICE
CERTIFICATE OF CORRECTION

PATENT NO. : 4,741,410

DATED : May 3, 1988

INVENTOR(S) : Fred Tunmore

It is certified that error appears in the above-identified patent and that said Letters Patent is hereby corrected as shown below:

| | |
|---|---|
| Col. 3, line 13 | Change "th" to --the-- |
| Col. 3, line 25 | Change "c]utch" to --clutch-- |
| Col. 3, line 33 | Change "mircroprocessor" to --microprocessor-- |
| Col. 4, line 38 | Change "vebicle" to --vehicle-- |
| Col. 7, line 3 | Change "acoelerator" to --accelerator-- |
| Col. 8, line 49 | Change "portizns" to --portions-- |
| Col. 9, line 51 | Change "first" to --said-- |
| Col. 9, line 60 | Delete --p1-- |

Signed and Sealed this

Twelfth Day of September, 1989

*Attest:*

DONALD J. QUIGG

*Attesting Officer*

*Commissioner of Patents and Trademarks*